US006983664B2

(12) United States Patent
Tokumoto

(10) Patent No.: US 6,983,664 B2
(45) Date of Patent: Jan. 10, 2006

(54) ROTATION ANGLE DETECTING DEVICE, AND TORQUE DETECTING DEVICE

(75) Inventor: Yoshitomo Tokumoto, Mie (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/694,906

(22) Filed: Oct. 29, 2003

(65) Prior Publication Data

US 2004/0098219 A1 May 20, 2004

(30) Foreign Application Priority Data

Oct. 29, 2002 (JP) .................................... P. 2002-314511

(51) Int. Cl.
*G01L 3/02* (2006.01)

(52) U.S. Cl. ................................................. 73/862.329

(58) Field of Classification Search ............ 73/862.329, 73/862.324, 862.328, 862.331, 862.332, 73/862.333, 862.193
See application file for complete search history.

(56) References Cited

U.S. PATENT DOCUMENTS 3,947,711 A * 3/1976 Presley et al. .............. 310/155
4,267,470 A 5/1981 Kawakami et al.
4,881,414 A * 11/1989 Setaka et al. .......... 73/862.331
5,023,547 A * 6/1991 Pawlak et al. .............. 324/174
5,086,741 A * 2/1992 Nakamura et al. ....... 123/406.2
5,236,518 A * 8/1993 Shirai et al. ................ 148/122
5,606,252 A * 2/1997 Gschossmann et al. ..... 324/166
5,606,254 A * 2/1997 Xie et al. .................... 324/174
6,763,733 B2 * 7/2004 Tokumoto .............. 73/862.333
6,776,058 B1 * 8/2004 Schroeder .............. 73/862.333
2002/0011840 A1 1/2002 Li

FOREIGN PATENT DOCUMENTS

DE 198 34 322 A1 2/2000
JP 2002-107112 4/2002

OTHER PUBLICATIONS

French Office Action dated Apr. 13, 2005.

* cited by examiner

*Primary Examiner*—Max Noori
(74) *Attorney, Agent, or Firm*—McGinn & Gibb, PLLC

(57) ABSTRACT

The rotation angle detecting device includes a target of a spur gear shape made rotatable together with a rotary member and having a plurality of teeth of magnetic members protruding at a substantially equal pitch in the circumferential direction of the axis of the rotary member, and magnetic sensors arranged at positions to confront the teeth for outputting output signals according to the rotation of the rotary member. This device detects the angle of rotation of a rotary member with the output signals from the magnetic sensors. In the target of the spur gear shape, moreover, the two circumferential end portions of the crests of all the teeth are formed into angular portions.

4 Claims, 4 Drawing Sheets

ROTATION ANGLE DETECTING DEVICE, AND TORQUE DETECTING DEVICE

BACKGROUND OF THE INVENTION

The present invention relates to a rotation angle detecting device to be used in an electric power steering device for a vehicle, for detecting the angle of rotation of a rotary member, and to a torque detecting device for detecting a torque to be applied to the rotary member.

As an auxiliary steering device mounted on a vehicle such as an automobile for assisting the steering operation of a driver, there is an electric power steering device for applying a steering assisting force such as the turning force of an electric motor. This electric power steering device is provided with an input shaft and an output shaft, which are so connected to a steering member and steering wheels sides respectively, as to rotate according to the steering operation of the driver. The steering device is provided with a rotation angle detecting device for detecting the respective rotation angles of the input and output shafts, and a torque detecting device for detecting the steering torque to be applied to the steering member by using the detection results of the detecting device. The steering device assists the steering operation by deciding an instruction value to the electric motor on the basis of the detected steering torque and by transmitting the motor turning force to a steering system through a reduction mechanism thereby apply the steering assisting force to the steering system (as referred to JP-A-2002-107112, for example).

Here, the rotation angle detecting device and the torque detecting device are provided with: a target so fixedly fitted on each of the input and output shafts as to rotate together and having a plurality of teeth made of a magnetic material; and a magnetic sensor including magnetoresistive elements for outputting output signals varying periodically according to the rotations of the corresponding input and output shafts. In the devices, the rotation angle can be detected based on the output signals (or its digitized signals, if necessary) from the magnetic sensor and by referring to a table, which is stored in advance with the rotation angle and the output signals of the magnetic sensor in a corresponding manner. On the other hand, the torque can be detected by determining the rotation angle difference (or the relative angle displacement) between the input shaft and the output shaft using the output signal (or its digitized signal, if necessary) from the magnetic sensor on the input shaft side and the output signal (or its digitized signal, if necessary) from the magnetic sensor on the output shaft side, and by calculating the relative angle displacement. In these devices, moreover, the target or the objective to be detected by the magnetic sensor uses a spur gear 54, in which the side faces 51 of a tooth are formed into an involute curve (as seen in a top plan view, as in the following) and in which the two end portions 53 of a tooth crest 52 are formed into a smooth curve.

However, the involute-shaped gear 54 generally has a main object to effect the power transmission by a meshing engagement and is worked to form the two end portions 53 of the tooth crest 52 into the gentle curve having no angular portion because it is intended to eliminate a failure such as chip. Therefore, a problem is that it is difficult to make the shapes of all teeth identical in an excellent size precision. On the other hand, the output signals from the magnetic sensors are decided mainly by the distance from the tooth crest 52 so that the target is generally tested with the tooth pitch. In the case of the involute gear 54, however, it is necessary to measure the tooth pitch L, as shown in FIG. 7, by supporting virtual corner portions 61. This necessity raises a problem that the target or the objective of the sensor detection is hard to test.

SUMMARY OF THE INVENTION

The present invention has been conceived in view of the background thus far described and has an object to provide a rotation angle detecting device capable of easily testing and a torque detecting device using the that device. Another object is to provide a rotation angle detecting device, which is not only easy in test but also inexpensive, and a torque detecting device using that device.

In order to solve the aforesaid object, the invention is characterized by having the following arrangement.

(1) A rotation angle detecting device comprising:

a target having a spur gear shape rotatable together with a rotary member, the target including,

- a plurality of magnetic teeth protruding at a substantially equal pitch in a circumferential direction of an axis of the rotary member, wherein each of the magnetic teeth are defined by a pair of side faces, and a crest surface between the side faces in the circumferential direction, and angular portions formed at boundaries between the side faces and the crest surfaces of all of the teeth; and magnetic sensors arranged so as to confront the plurality of teeth for outputting output signals according to a rotation of the rotary member, thereby to detect a rotation angle of the rotary member based on the output signals.

(2) The rotation angle detecting device according to (1), wherein the side faces are flat.

(3) The rotation angle detecting device according to (1), wherein a bottom land and the corresponding side faces which are disposed between the adjacent two teeth constitute an arcuate face recessed radially.

(4) A torque detecting device comprising:

a rotation member including a first rotary shaft and a second rotary shaft connected coaxially to the first rotary shaft;

rotation angle detecting devices provided to the first and second rotary shafts, respectively, each of the rotation angle detecting devices including,

- a target having a spur gear shape rotatable together with a rotary member, the target including,
  - a plurality of magnetic teeth protruding at a substantially equal pitch in a circumferential direction of an axis of the rotary member, wherein each of the magnetic teeth are defined by a pair of side faces, and a crest surface between the side faces in the circumferential direction, and
  - angular portions formed at boundaries between the side faces and the crest surfaces of all of the teeth;

magnetic sensors arranged so as to confront the plurality of teeth for outputting output signals according to a rotation of the rotary member, thereby to detect a rotation angle of the rotary member based on the output signals; and a torque detecting unit for detecting a torque to be applied to the rotary member based on signals outputted from the corresponding rotation angle detecting devices.

DESCRIPTION OF THE PREFERRED EMBODIMENTS

A rotation angle detecting device and a torque detecting device according to a preferred embodiment of the invention will be described with reference to the accompanying drawings. Here in the following description, the invention is applied to an electric power steering.

Figure 1:
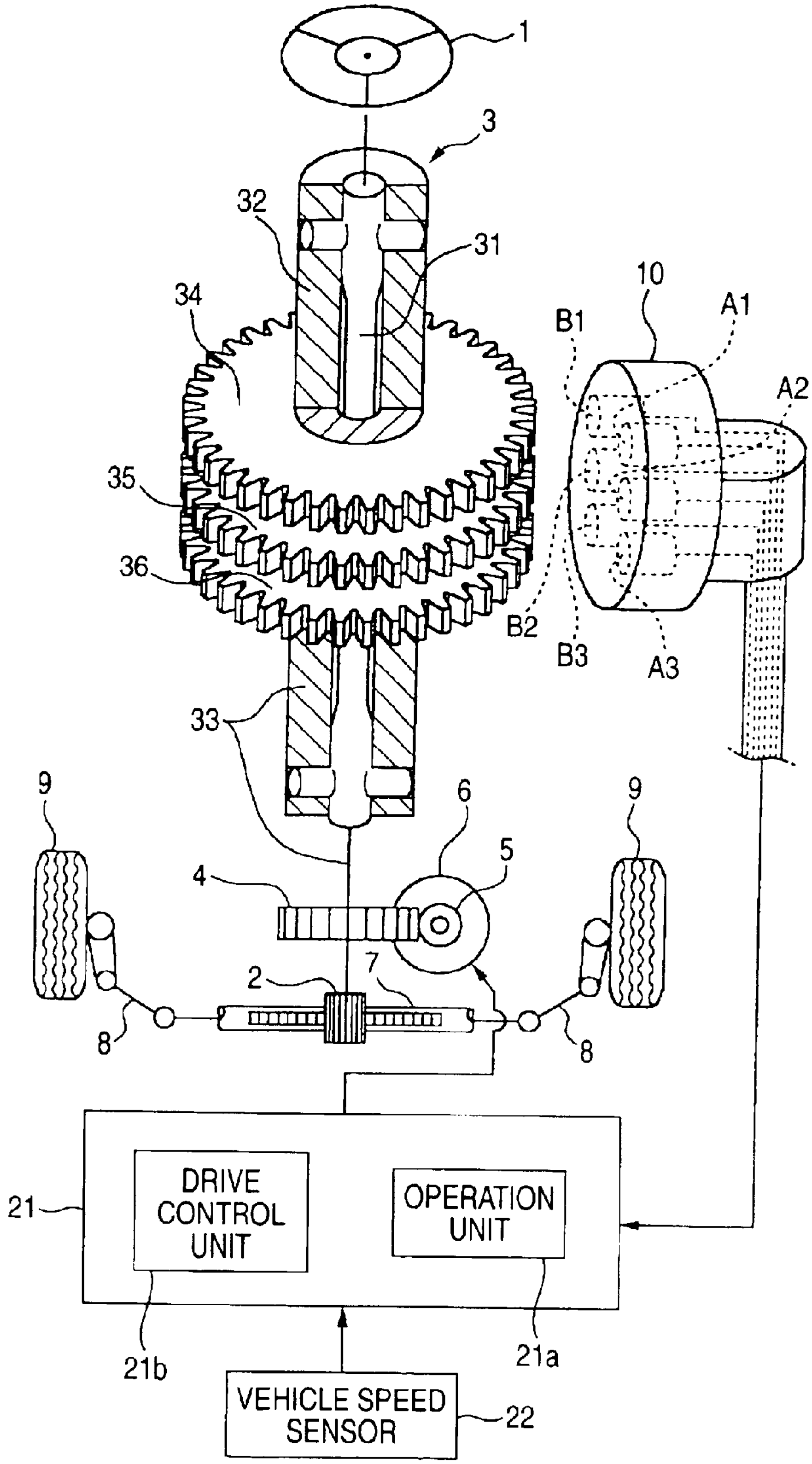
FIG. 1 is a diagram schematically showing a structure of an electric power steering device according to one embodiment of the invention.

FIG. 1 is a diagram schematically showing a construction of an essential portion of the electric power steering device including the rotation angle detecting device and the torque detecting device according to the embodiment of the invention. The electric power steering device is so mounted on an automobile, for example, that a steering shaft 3 is interposed between a steering member (or steering wheel) 1 and a pinion 2. The steering shaft 3 is provided with: a torsion bar 31 disposed at the center of the steering shaft 3; an input shaft 32 acting as a first rotary shaft and fixed to the input (upper) side of the torsion bar 31; and an output shaft 33 acting as a second rotary shaft and fixed to the output (lower) side of the torsion bar 31. The input shaft 32 and the output shaft 33 are arranged coaxially with each other and is connected to each other not directly but through the torsion bar 31.

The steering member 1 is connected to the input shaft 32 so that the rotation of the steering member 1 by the steering operation of a driver is transmitted directly to the input shaft 32.

A reduction mechanism having a worm 5 and a worm wheel 4 meshing with the worm 5; and a steering assisting electric motor 6 having an output shaft, on which the worm 5 is mounted integrally rotatably therewith, and controlled by a control unit 21 are connected to the output shaft 33. The rotation of the electric motor 6 is reduced and transmitted as a steering assisting force to the pinion 2. The rotation of the pinion is converted into linear motions of a rack 7 thereby to steer steering wheels 9 through left and right tie rods 8. The reduction mechanism and the electric motor 6 constitute an auxiliary steering unit for applying the steering assisting force to a steering system leading from the steering member 1 to the steering wheels 9.

The input shaft 32 and the output shaft 33 are provided with targets and magnetic sensors, which are included in the rotation angle detecting device and the torque detecting device of the invention, for outputting output signals corresponding to the input and output shafts 32 and 33 which rotate according to the steering operation on the steering member 1.

Figure 2:
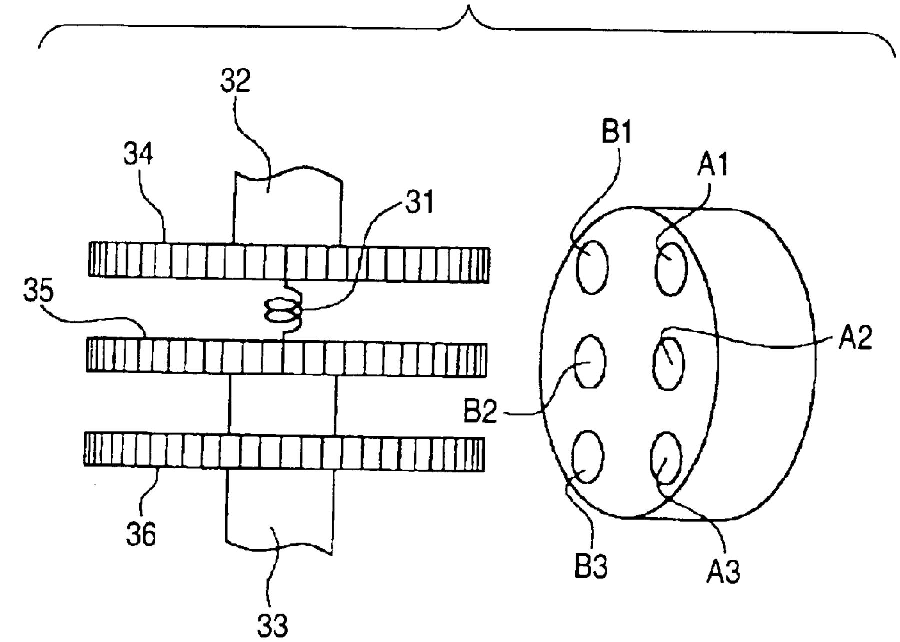
FIG. 2 is a diagram schematically showing a torsion bar, an input shaft, an output shaft, respective target gears and magnetic sensors in the electric power steering device.

With reference to FIG. 2, a first target gear 34 of a spur gear shape is so fixedly fitted on the input shaft 32 as to rotate together. A pair of first magnetic sensors A1 and B1 are arranged at positions to confront the teeth of the target 34 and are spaced in the circumferential direction. Likewise, second and third target gears 35 and 36 are so fixedly fitted on the output shaft 33 as to rotate together. A pair of second magnetic sensors A2 and B2 are arranged at positions to confront the teeth of the target 35 and are spaced in the circumferential direction, and a pair of third magnetic sensors A3 and B3 are arranged at positions to confront the teeth of the target 36 and are spaced in the circumferential direction.

The first to third targets 34 to 36 are formed into the shape of a spur gear, in which a plurality of teeth of a magnetic material protrude at a substantially equal spacing in the circumferential direction. The tooth numbers of the first target 34 and the second target 35 are equal at N (e.g., 36), and the tooth number of the third target 36 is a prime (e.g., 35) (having no common divisor other than 1) to N.

The teeth of the targets 34 to 36 have angular portions at the two end portions in the circumferential direction on their crests. In the related art, specifically, the tooth side faces of the targets 34 to 36 are formed into an involute curve so that the two end portions of the tooth crests are not formed into the angular portions but into a gentle curve, but these angular portions are formed in the invention. As a result, the tooth pitch can be directly measured with reference to those angular portions so that the targets can be simply inspected.

Figure 3:
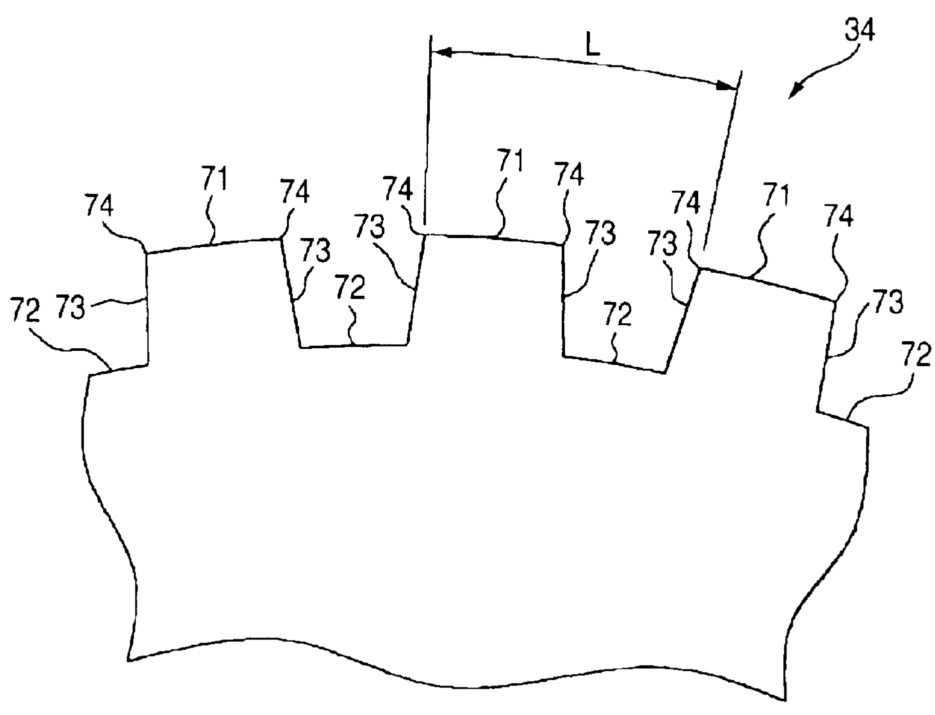
FIG. 3 is a top plan view showing a portion of one example of the target schematically.

More specifically, the target 34 is made arcuate not only at its tooth crest 71 but also at its bottom land 72, as shown in FIG. 3. Tooth side faces 73 are formed flat. The two circumferential end portions 74 of the tooth crest 71, that is, the boundaries (or ridgelines) between the tooth crest 71 and the tooth side faces 73 are formed into the angular portions. As a result, a tooth pitch L can be directly measured with reference to the two angular end portions 74, as shown in FIG. 3.

This target 34 can be simply manufactured, for example, by subjecting a disc of a magnetic material to the gear cutting, press working or sintering treatment using a milling machine.

Here, the targets 35 and 36 can be likewise manufactured so that their description is omitted.

Reverting to FIG. 1 and FIG. 2, the first to third magnetic sensors A1 and E1, A2 and B2, and A3 and B3, as arranged at positions to confront the first to third targets 34 to 36, are arranged in three steps and two rows and are housed in a sensor box 10. This sensor box 10 is fixed at a predetermined position of a vehicle body and can keep a gap at a predetermined distance between the first to third targets 34 to 36 and the first to third magnetic sensors A1 and B1, A2 and B2, and A3 and B3. Here, the pair of first magnetic sensors A1 and B1 are arranged in the state spaced from each other. Likewise, the pair of second magnetic sensors A2 and B2 are arranged in the state spaced from each other, and the pair of third magnetic sensors A3 and B3 are arranged in the state spaced from each other.

The respective magnetic sensors A1 to A3 and B1 to B3 include elements such as magnetoresistive effect elements (or MR elements) characterized to have resistances varied by the action of a magnetic field, so that they output periodically varying voltage signals, period of which is defined mainly by the distance between the adjacent tooth crests of the confronted targets 34 to 36. When the first target 34 rotates together with the input shaft 32 in accordance with the steering operation of the driver, the output signal is made into such a periodic signal mainly according to the distance between the first magnetic sensors A1 and B1 and the tooth crests as varies according to the variation (or angular displacement) of the rotation angle of the input shaft 32 and the target 34. When the second target 35 rotates together with the output shaft 33, the output signal is made into such a periodic signal mainly according to the distance between the second magnetic sensors A2 and B2 and the tooth crests as varies according to the variation of the rotation angle of the output shaft 33 and the target 35. When the third target 36 rotates together with the output shaft 33, the output signal is made into such a periodic signal mainly according to the distance between the third magnetic sensors A3 and B3 and the tooth crests as varies according to the variation of the rotation angle of the output shaft 33 and the target 36. The gears having the shape of a spur gear (as referred to FIG. 3) which can manage the aforementioned tooth pitch L are employed as the targets 34 to 36. Therefore, the periodic signal has no discrepancy so that a more precise output signal can be obtained.

Figure 4:
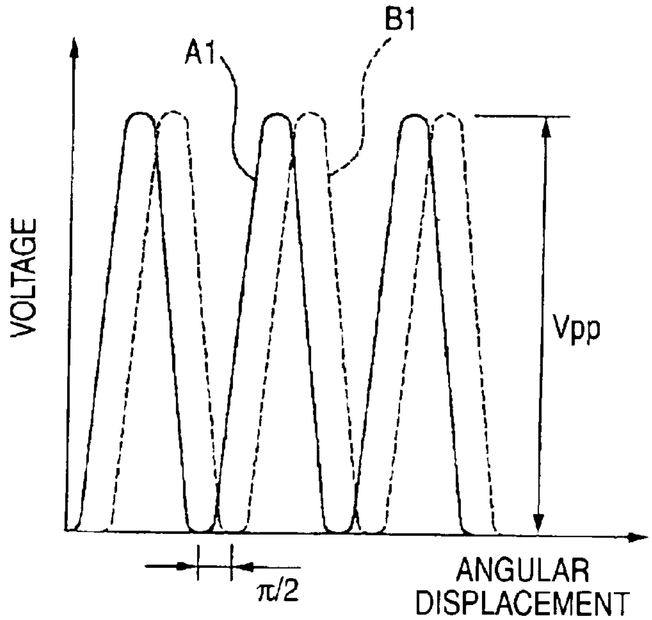
FIG. 4 is a graph illustrating an output signal (or voltage) from the magnetic sensors.

Moreover, the first magnetic sensors A1 and B1 are arranged in such a spaced state that their output signals may establish a phase difference of $\pi/2$, for example, in the electrical angle, as shown in FIG. 4 Likewise, the second magnetic sensors A2 and B2 are arranged in such a spaced state that their output signals may establish the phase difference of $\pi/2$, and the third magnetic sensors A3 and B3 are arranged in such a spaced state that their output signals may establish the phase difference of $\pi/2$. By thus shifting the phases of the output signals, even if nonlinear changes appear near the maximal and minimal values of the output waveform, the later-described control unit 21 can use, when the signal of one of the two magnetic sensors A1 to A3 and B1 to B3 is in the nonlinear region, the signal of the other in the linear region, thereby to prevent the respective rotation detecting precisions of the input and output shafts 32 and 33 from degrading.

The control unit 21 is provided with an operation unit 21*a* for performing a predetermined arithmetic operation with the outputs (which are used after they were converted into digital signals by the not-shown A/D converters, if necessary, as in the following description on the operations) of the first to third magnetic sensors A1 to A3 and B1 to B3, and a drive control unit 21*b* for controlling the drive of the electric motor 6 on the basis of the operation results of the operation unit 21*a*. To this control unit 21, there is inputted the signal of a vehicle speed detected by a vehicle speed sensor 22, so that the control unit 21 decides the turning force to be generated by the electric motor 6, in view of the running speed of the automobile. Moreover, the control unit 21 is provided with a (not-shown) data storage unit constructed of a nonvolatile memory or the like, which is suitably stored in advance with not only a program or tabulated information necessary for the drive control of the electric motor 6 but also the operation results of the respective portions of the unit 21 and the information indicating the running state of the automobile from the vehicle speed sensor 22.

The operation unit 21*a* is constituted to have: the function of a rotation angle detecting unit for detecting the respective rotation angles of the corresponding input and output shafts 32 and 33 with the output signals of the magnetic sensors A1 to A3 and B1 to B3; the function of a torque detecting unit for detecting the steering torque to be applied to the steering member 1, with the respective rotation angles detected by the rotation angle detector; and the function to determine the steering torque and the steering angle to be applied to the steering member 1, by calculations with the detected respective rotation angles, thereby to decide the steering assisting force to be applied from the auxiliary steering unit, on the basis of the steering torque and steering angle determined. Specifically, the operation unit 21*a* acquires the output signals of the magnetic sensor A1 and B1, and A2 and B3, for example, for a predetermined sampling period, and obtains the rotation angles of the corresponding input shaft 32 and output shaft 33, and then determines the absolute values of the relative rotation angle of the input and output shafts 32 and 33 thereby to calculate the steering torque and steering angle to be applied to the steering member 1. On the basis of the steering torque and steering angle calculated, moreover, the operation unit 21*a* decides a command value to the electric motor 6 and instructs the drive control unit 21*b*. Here, the operation unit 21*a* is also enabled to determine the absolute value of the absolute rotation angle of the output shaft 33 and to calculate the steering torque and the steering angle by using the output signals of the magnetic sensors A3 and B3.

On the basis of the command value instructed by the operation unit 21*a*, the drive control unit 21*b* feeds the electric motor 6 with an electric current and drives the electric motor 6. As a result, the electric power steering device of this embodiment can detect the steering operation of the driver and can apply the steering assisting force according to the operation.

Figure 5:
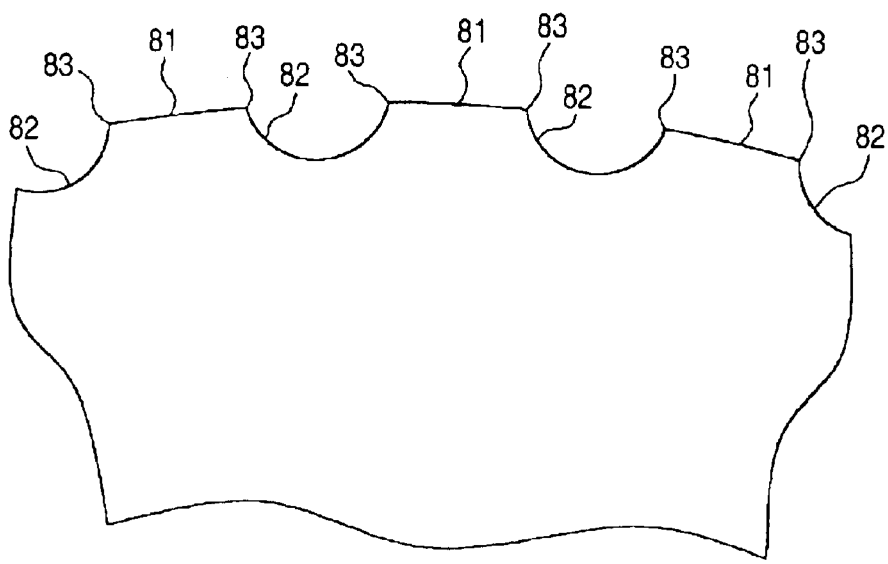
FIG. 5 is a top plan view showing a portion of another example of the target schematically.

The foregoing description has been made on the case the gears of a spur gear shape, as shown in FIG. 3, are used. However, the invention should not be limited thereto but may use gears shown in FIG. 5, for example. Specifically, the targets 34 to 36 maybe constructed such that their tooth crests 81 are arcuate, such that the face existing between the respective tooth crests 81 is an arcuate face 82, which is radially recessed to have no boundary between the tooth side face and the bottom land, and such that their two circumferential end portions 83 of the tooth crest 81, namely, the boundaries (or ridgelines) between the tooth crest 81 and the arcuate face 82 are formed into the angular portions. Here, these targets 34 to 36 can be simply manufactured by the gear cutting, press working or sintering treatment using the milling machine.

Figure 6:
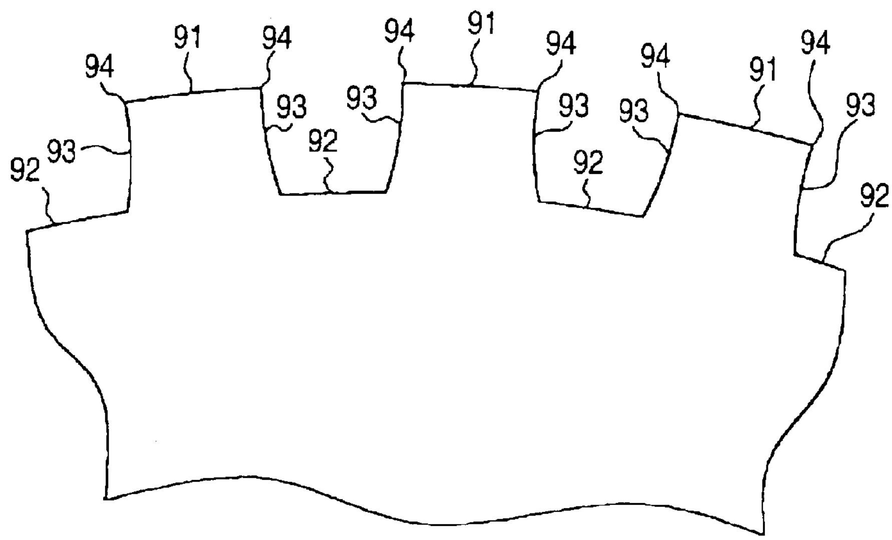
FIG. 6 is a top plan view showing a portion of still another example of the target schematically.
Figure 7:
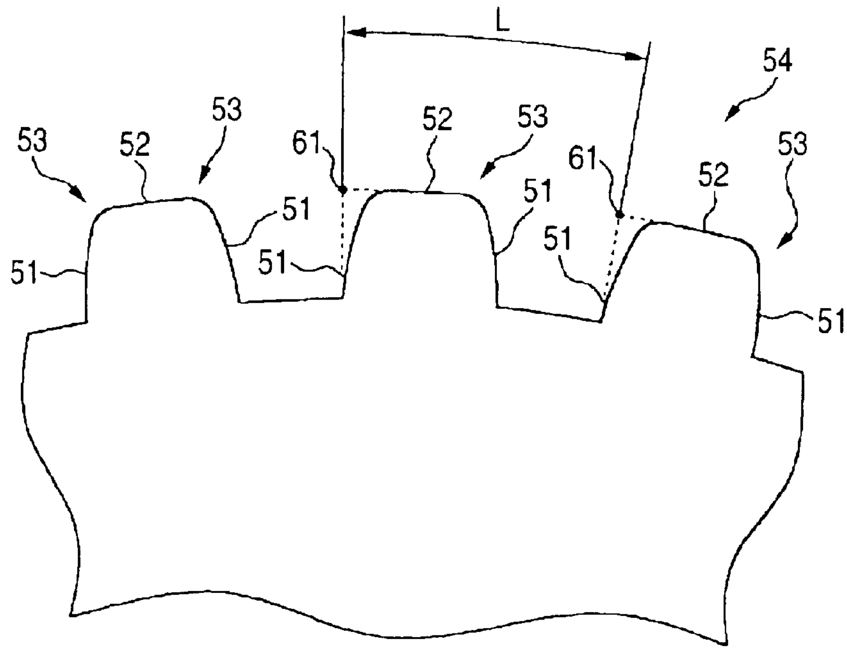
FIG. 7 is a top plan view showing a portion of a target of an involute tooth shape of the related art schematically.

Moreover, there may be used a gear, as shown in FIG. 6. Specifically, the targets 34 to 36 maybe constructed such that not only their tooth crests 91 but also their bottom lands 92 are made arcuate, such that their tooth side faces 93 are recessed inward of the teeth into an arcuate shape, and such that their two circumferential end portions 94, namely the boundaries (or ridgelines) between the tooth crest 91 and the tooth side faces 93 are formed into the angular portions. Here, these targets 34 to 36 can be simply manufactured by the gear cutting, press working or sintering treatment using the milling machine.

In the foregoing description, the invention is applied to the electric power steering device having the auxiliary steering unit for applying the steering assisting force to the steering system with the reduction mechanism and the electric motor 6. However, the rotation angle detecting device and the torque detecting device of the invention should not be limited thereto but can also be applied to a variety of detecting devices for detecting the rotation angle of a rotary member or the torque to be applied to the rotary member. The invention can be further applied to a hydraulic power steering device for controlling hydraulic valves on the basis of the steering torque, for example.

According to the rotation angle detecting device of the invention, as has been described hereinbefore, the two circumferential side end portions on the tooth crests are formed into the angular portions so that the rotation angle detecting device provided can be easily tested.

Especially in the rotation angle detecting device, in case the side faces of each tooth are flat or in case the portion between the crests of each tooth is radially recessed into the arcuate face, the manufacturing cost can be suppressed to lower the price of the rotation angle detecting device advantageously.

According to the torque detecting device of the invention, the rotation angle detecting device is incorporated so that the torque detecting device provided can be easily tested. Especially in case the side faces of each tooth are flat or in case the portion between the crests of each tooth is radially recessed into the arcuate face, the price of the torque detecting device is also advantageously lowered.

What is claimed is:

1. A rotation angle detecting device comprising:

a target having a spur gear shape rotatable together with a rotary member, the target comprising:

a plurality of magnetic teeth protruding at a substantially equal pitch in a circumferential direction of an axis of the rotary member, wherein each of the magnetic teeth are defined by a pair of side faces, and a crest surface between the side faces in the circumferential direction; and angular portions formed at boundaries between the side faces and the crest surfaces of all of the teeth for directly measuring the pitch of the teeth; and magnetic sensors arranged so as to directly confront the plurality of teeth for outputting output signals according to a rotation of the rotary member, thereby to detect a rotation angle of the rotary member based on the output signals.

2. The rotation angle detecting device according to claim 1, wherein the side faces are flat.

3. The rotation angle detecting device according to claim 1, wherein a bottom land and the corresponding side faces, which are disposed between the adjacent two teeth, comprise an arcuate face recessed radially.

4. A torque detecting device comprising:

a rotation member comprising a first rotary shaft and a second rotary shaft connected coaxially to the first rotary shaft;

rotation angle detecting devices provided to the first and second rotary shafts, respectively, each of the rotation angle detecting devices comprising:

a target having a spur gear shape rotatable together with a rotary member, the target comprising:

a plurality of magnetic teeth protruding at a substantially equal pitch in a circumferential direction of an axis of the rotary member, wherein each of the magnetic teeth are defined by a pair of side faces, and a crest surface between the side faces in the circumferential direction, and angular portions formed at boundaries between the side faces and the crest surfaces of all of the teeth for directly measuring the pitch of the teeth;

magnetic sensors arranged so as to directly confront the plurality of teeth for outputting output signals according to a rotation of the rotary member, thereby to detect a rotation angle of the rotary member based on the output signals; and a torque detecting unit for detecting a torque to be applied to the rotary member based on signals outputted from the corresponding rotation angle detecting devices.

* * * * *